(12) United States Patent
Collard et al.

(10) Patent No.: US 11,644,011 B2
(45) Date of Patent: May 9, 2023

(54) RELATING TO WIND TURBINE BLADES

(71) Applicant: Vestas Wind Systems A/S, Aarhus N. (DK)

(72) Inventors: Toby Collard, Cowes (GB); Nathan A. Brilliant, Arvada, CO (US); Chris Sutton, Romsey (GB); Lasse Lykkegaard, Herning (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/258,764

(22) PCT Filed: Jul. 5, 2019

(86) PCT No.: PCT/DK2019/050222
§ 371 (c)(1),
(2) Date: Jan. 8, 2021

(87) PCT Pub. No.: WO2020/011326
PCT Pub. Date: Jan. 16, 2020

(65) Prior Publication Data
US 2021/0164447 A1    Jun. 3, 2021

Related U.S. Application Data

(60) Provisional application No. 62/695,397, filed on Jul. 9, 2018.

(30) Foreign Application Priority Data

Jul. 20, 2018 (DK) .......................... PA 2018 70493

(51) Int. Cl.
*F03D 80/30* (2016.01)
*F03D 1/06* (2006.01)

(52) U.S. Cl.
CPC .......... *F03D 80/30* (2016.05); *F03D 1/0675* (2013.01); *F05B 2240/21* (2013.01); *F05B 2240/302* (2013.01); *F05B 2240/85* (2020.08)

(58) Field of Classification Search
CPC ........................................... F01D 80/30
See application file for complete search history.

(56) References Cited

U.S. PATENT DOCUMENTS 8,043,065 B2 * 10/2011 Kyriakides ............ F03D 80/30
416/223 R
8,562,296 B2 * 10/2013 Arocena De La Rua ..................
F03D 80/30
416/232

(Continued)

FOREIGN PATENT DOCUMENTS

DE    102015115190 A1    3/2017
EP    2226497 A1    9/2010

(Continued)

OTHER PUBLICATIONS

Danish Patent and Trademark Office, Search and Examination Report in PA 2018 70493, dated Jan. 23, 2019.

(Continued)

*Primary Examiner* — Eldon T Brockman
(74) *Attorney, Agent, or Firm* — Wood Herron & Evans LLP (57) ABSTRACT

Improvements relating to wind turbine blades A wind turbine blade is described that comprises a main blade and one or more separate edge modules attached to the main blade module. The main blade module defines a main body of the blade, and the separate edge module(s) defines at least part of a leading edge or a trailing edge of the blade. A down conductor for a blade lightning protection system is embedded within the edge module.

15 Claims, 6 Drawing Sheets

(56) References Cited

U.S. PATENT DOCUMENTS

| | | | |
|---|---|---|---|
| 9,422,914 B2* | 8/2016 | Appleton | H01Q 15/145 |
| 9,920,739 B2* | 3/2018 | Akhtar | F03D 13/10 |
| 10,465,662 B2* | 11/2019 | Søgaard | F03D 80/30 |
| 10,883,479 B2* | 1/2021 | Whitehouse | F03D 1/0675 |
| 11,225,949 B2* | 1/2022 | Whitehouse | F03D 80/30 |
| 2008/0187442 A1 | 8/2008 | Standish et al. | |
| 2010/0272570 A1* | 10/2010 | Arocena De La Rua | F03D 80/30 416/146 R |
| 2010/0278654 A1* | 11/2010 | Kyriakides | F03D 80/30 416/226 |
| 2012/0301300 A1* | 11/2012 | Muto | F03D 1/0675 416/146 R |
| 2013/0149153 A1* | 6/2013 | Fujioka | H02G 13/00 416/229 R |
| 2014/0118177 A1* | 5/2014 | Appleton | H01Q 15/14 342/1 |
| 2015/0204311 A1* | 7/2015 | Clemens | F03D 80/30 219/539 |
| 2016/0177926 A1* | 6/2016 | Akhtar | F03D 80/30 29/745 |
| 2016/0245264 A1* | 8/2016 | Søgaard | F03D 1/0675 |
| 2016/0258423 A1* | 9/2016 | Whitehouse | F03D 1/0675 |
| 2018/0112649 A1 | 4/2018 | Shain et al. | |

FOREIGN PATENT DOCUMENTS

| | | |
|---|---|---|
| EP | 2243955 A2 | 10/2010 |
| EP | 2246558 A2 | 11/2010 |
| GB | 2519331 A | 4/2015 |
| WO | 2005026538 A1 | 3/2005 |
| WO | 2015189338 A1 | 12/2015 |
| WO | 2018206158 A1 | 11/2018 |

OTHER PUBLICATIONS

European Patent Office, International Search Report and Written Opinion in PCT Application No. PCT/DK2019/050222, dated Sep. 16, 2019.

* cited by examiner

RELATING TO WIND TURBINE BLADES

TECHNICAL FIELD

The present invention relates generally to wind turbine blades comprising lightning protection components.

BACKGROUND

Modern utility scale wind turbine blades often include lightning protection components which protect the blade from damage in the event of a lightning strike. Lightning protection components typically comprise a plurality of conductive lightning receptors arranged at the surface of the blade and a conductive blade-tip. These may be electrically connected to a down conductor cable which typically runs longitudinally inside the blade and is connected to earth.

The down conductor is typically fixed inside the blade after the blade shells have been cured, but before the blade shells have been assembled together. The lightning receptors are typically added to the exterior surface of the blade after the blade has been assembled, and this involves drilling through the shell, from the surface of the blade to the internal down conductor. However, this can be a time-consuming process due to the need to connect the down conductor to the various lightning receptors spaced along the length of the blade shell. The process is made more difficult by the narrowing geometry of the blade tip, where access is restricted.

There is a continual need to improve the efficiency of wind turbine blade production to reduce the time taken to produce a blade.

It is against this background that the present invention has been developed.

SUMMARY OF THE INVENTION

According to a first aspect of the present invention, there is provided a wind turbine blade comprising a main blade module defining a main body of the blade, and a separate edge module attached to the main blade module. The edge module defines at least part of a leading edge or a trailing edge of the blade. A down conductor for a blade lightning protection system is embedded within the edge module.

The edge module may be a premanufactured module, i.e. it may be made separately from the main blade module, and be attached to the main blade module to form the wind turbine blade. The edge module may be adhesively bonded to the main blade module and/or it may be mechanically attached, for example using screws or bolts amongst other fastening methods. The edge module comprises a suction surface and a pressure surface. When the edge module is attached to the main blade module, the suction surface and the pressure surface of the edge module are aligned with respective suction and pressure surfaces of the main blade module.

The down conductor may be embedded during manufacture of the edge module, e.g. it may be laid up in a mould together with the other parts forming the edge module, i.e. it may be moulded within the edge module. Alternatively, the down conductor may be inserted into the edge module after manufacture of the edge module.

A plurality of edge modules may be attached to the main blade module and may be arranged adjacent to one another in a spanwise direction of the blade. Each edge module may define part of the leading edge or trailing edge of the blade, and each edge module may comprise a down conductor. The down conductors of adjacent edge modules may be electrically connected together.

The down conductors of first and second adjacent edge modules may be electrically connected together via an electrical connector assembly. The electrical connector assembly may comprise a first electrical connector provided at an end of the first edge module, and a second electrical connector provided at an end of the second edge module.

The wind turbine blade may further comprise a lightning receptor attached to the electrical connector assembly. A plurality of lightning receptors may be attached to the electrical connector assembly. The lightning receptor may be at least partially accommodated within an aperture in an outer surface of the first and/or second edge module. The aperture may provide access to the connector assembly without requiring any drilling through the outer surface of the edge module. The aperture may be defined by cut-out portions provided in the first and/or second adjacent edge modules.

The lightning receptor may be in the form of a conductive cap that at least partially covers an interface between the first and second edge modules. The conductive cap may be arranged externally on the edge modules.

The main blade module of the wind turbine blade may further comprise a conductive layer at or near its outer surface and the down conductor of an edge module may be electrically connected to the conductive layer.

The down conductor of the or each edge module may be electrically connected to the conductive layer via a respective electrical link. The electrical link may take any suitable form, for example a cable or a bus bar. The or each electrical link of the wind turbine blade may extend in a generally chordwise direction across an interface between the main blade module and a respective edge module.

The or each electrical link may be received in a respective chordwise channel defined in an outer surface of the blade. The or each channel may be defined in part by a first recess defined in the main blade module and in part by a second recess defined in the edge module. The recesses may be aligned to define the respective chordwise channel. A first electrical contact may be located within the first recess. A second electrical contact may be located within the second recess. The first electrical contact may be electrically connected to the conductive layer of the main blade module. The second electrical contact may be electrically connected to the down conductor of the edge module.

The wind turbine blade may further comprise a metal tip. The metal tip may comprise a mechanical attachment feature for connecting the metal tip to the main blade module and an electrical terminal for connecting the metal tip to the down conductor of an edge module.

The mechanical attachment feature may be a male/female feature for mating with a corresponding female/male mechanical attachment feature of the main blade module. The electrical terminal may be a male/female feature for mating with a corresponding female/male electrical terminal of the edge module.

The mechanical attachment feature is preferably a separate feature that is physically different to the electrical terminal. The mechanical attachment feature and electrical terminal may be spaced apart in the chordwise direction of the wind turbine blade.

In one embodiment, the metal tip may comprise female features in the form of first and second sockets. When the metal tip is connected, the first socket may receive a male tip implant that protrudes from the main blade module. The second socket may receive a male electrical connector attached to an end of the down conductor of the edge module. In other embodiments, the mechanical attachment feature or the electrical terminal of the metal tip may comprise a protruding male feature for insertion into a corresponding socket of the main blade module or edge module.

The electrical terminal of the metal tip is preferably smaller than the mechanical attachment feature of the metal tip.

DETAILED DESCRIPTION

Figure 1:
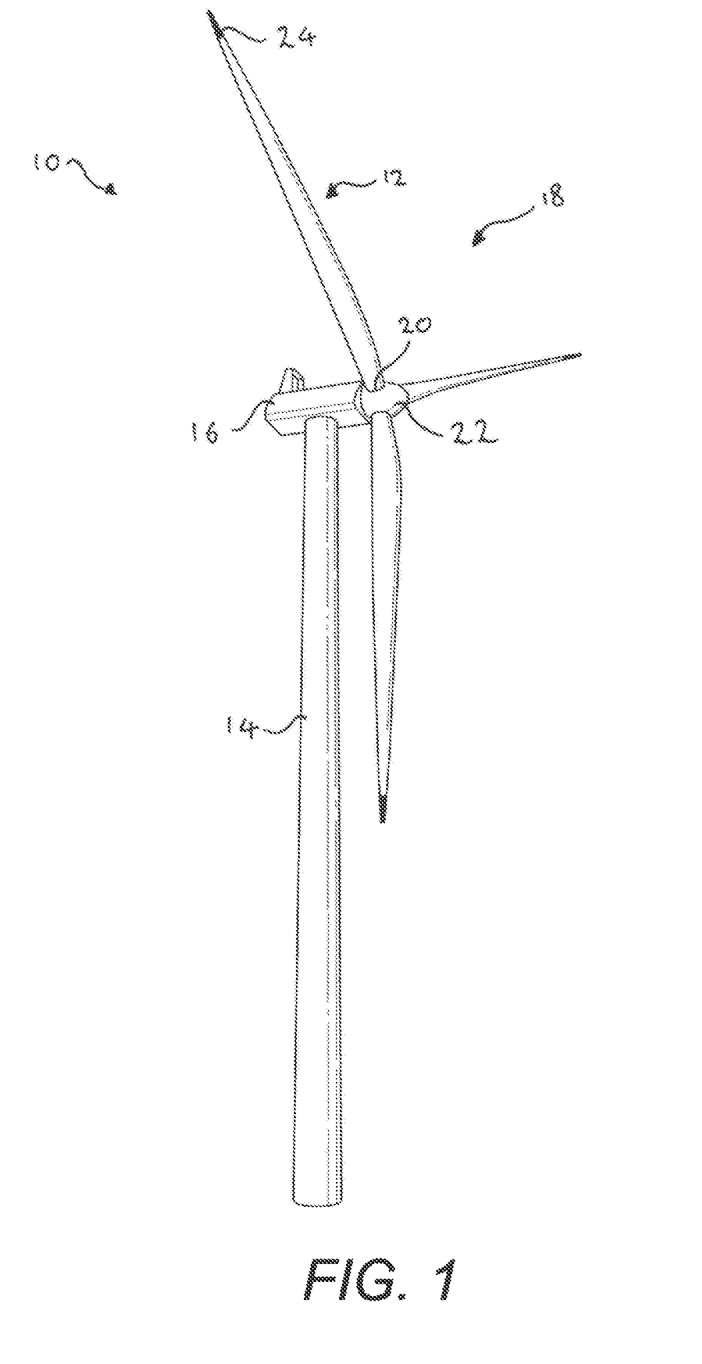
FIG. 1 shows a wind turbine comprising a plurality of blades.

FIG. 1 is a schematic perspective view of a modern utility-scale wind turbine 10 comprising wind turbine blades 12 in accordance with an embodiment of the present invention. The wind turbine 10 comprises a tower 14 supporting a nacelle 16. A rotor 18 is mounted to the nacelle 16. The rotor 18 comprises a plurality of radially extending wind turbine blades 12, which are attached at their respective root ends 20 to a central hub 22. In this example, the rotor 18 comprises three blades 12, but in other embodiments the rotor 18 may have any number of blades 12. In this example, the blades 12 each have a solid metal tip 24, which acts a lightning receptor.

Figure 2:
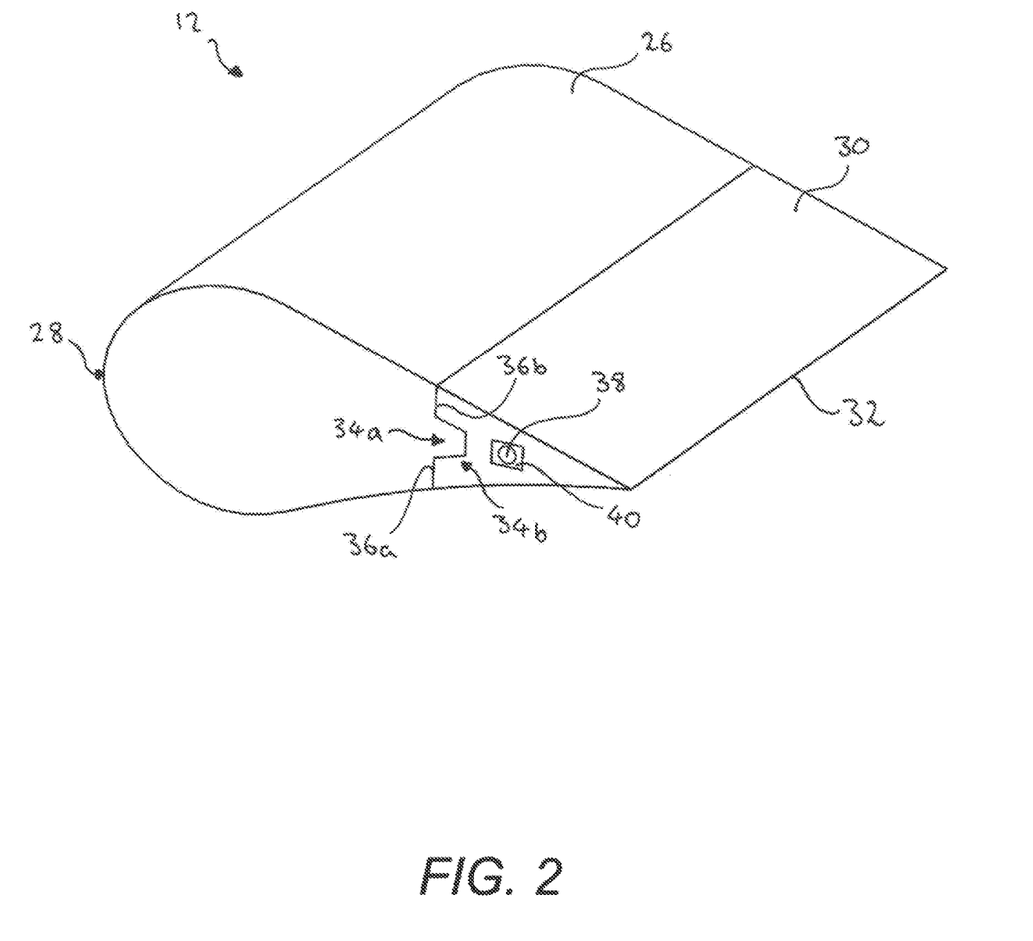
FIG. 2 is a schematic view of part of a wind turbine blade comprising a main blade module and an edge module.

FIG. 2 schematically shows part of a wind turbine blade 12 according to an example of the present invention. The blade 12 comprises a main blade module 26 defining a main body of the blade 12. In this example, the main blade module 26 defines a leading edge 28 of the blade 12. The blade 12 further includes a separate edge module 30 attached to the main blade module 26. The edge module 30 in this example defines part of a trailing edge 32 of the blade 12. A plurality of similar edge modules 30 may be arranged end-to-end along at least part of the length of the main blade module 26 to define the trailing edge 32 of the blade 12.

The main blade module 26 is preferably formed from composite materials, for example fibre-reinforced plastic such as glass-fibre reinforced plastic (GFRP). The main blade module 26 may be formed using any suitable technique known for forming wind turbine blade shells, e.g. vacuum-assisted resin transfer moulding (VARTM). The edge module 30 may also be formed from composite materials, e.g. GFRP, and may be a moulded part. This may also be formed by VARTM, injection moulding or other suitable technique. Alternatively, the edge module 30 could be made from an elastomeric material, such as plastic or rubber.

The edge module 30 is a premanufactured module, i.e. it is made separately from the main blade module 26, and is attached to the main blade module 26 to form the wind turbine blade 12. In this example, the edge module 30 is adhesively bonded to the main blade module 26. In other examples, the edge module 30 may be mechanically attached to the main blade module 26, for example using screws, bolts etc. either instead of adhesive bonding, or in addition to adhesive bonding. As shown in FIG. 2, corresponding mating features 34a, 34b may be provided on mating surfaces 36a, 36b of the main blade module 26 and the edge module 30 to facilitate location and connection between the modules 26, 30.

A down conductor 38 for a blade lightning protection system is embedded within the edge module 30. Insulation 40 is optionally provided around the down conductor 38. The down conductor 38 may be embedded during manufacture of the edge module 30, e.g. it may be laid up in a mould together with the other parts forming the edge module 30, i.e. it may be moulded within the edge module 30. Alternatively, the down conductor 38 may be inserted into the edge module 30 after manufacture of the edge module 30.

Figure 3:
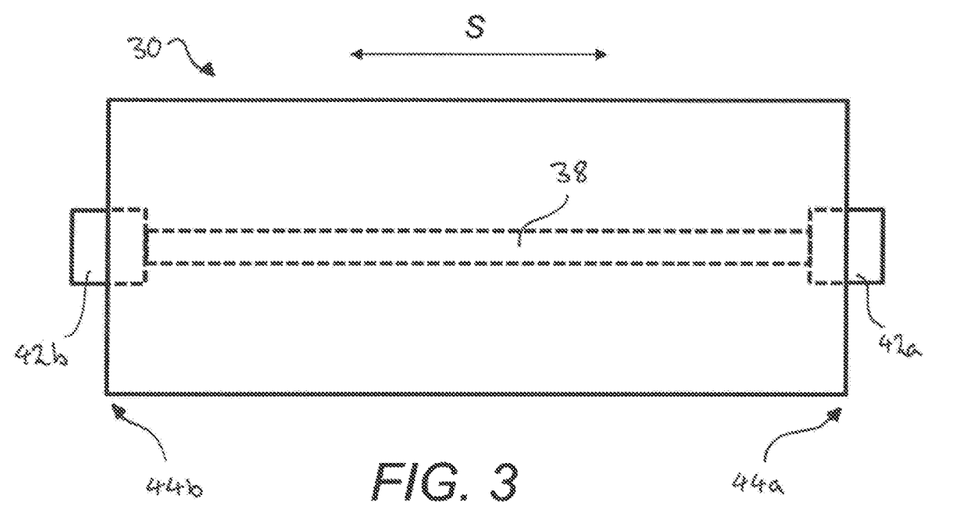
FIG. 3 is a schematic plan view of an edge module.

Referring now to FIG. 3, this is a schematic plan view of the edge module 30, with internal components of the edge module 30 such as the down conductor 38 shown by dashed lines. The down conductor 38 in this example is a metal cable that extends longitudinally, in a spanwise direction (S), through the edge module 30. First and second electrical connectors 42a, 42b are provided respectively at each end 44a, 44b of the edge module. The down conductor 38 is connected between these connectors 42a, 42b.

Figure 4:
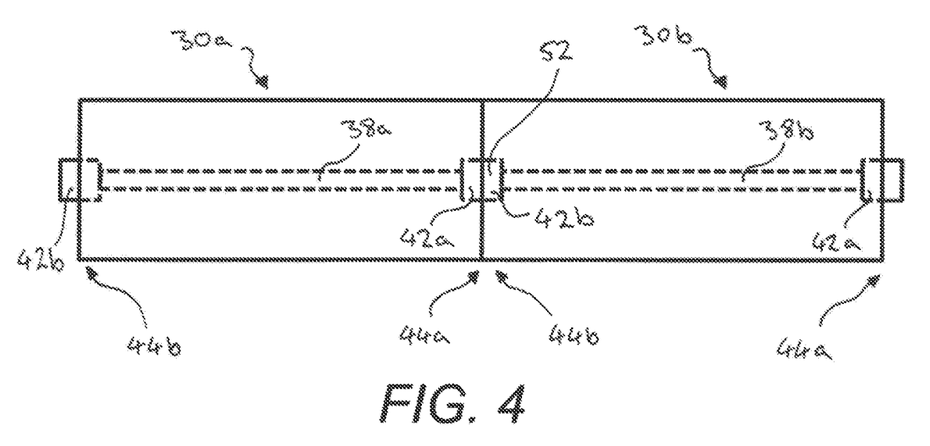
FIG. 4 is a schematic plan view showing two edge modules connected together.

Referring to FIG. 4, this schematically shows first and second edge modules 30a, 30b arranged end-to-end. The edge modules 30a, 30b each have a down conductor cable 38a, 38b extending there through, and electrical connectors 42a, 42b provided at each end 44a, 44b. The electrical connectors 42a, 42b of adjacent edge modules 30a, 30b are configured to connect to each other to form an electrical connector assembly 52 that establishes an electrical connection between the down conductors 38a, 38b of the adjacent edge modules 30a, 30b. The provision of electrical connectors 42a, 42b at one or both ends 44a, 44b of an edge module 30 provides a 'plug-and-play' solution, which facilitates rapid connection between the down conductors 38a, 38b of the adjacent edge modules 30a, 30b when installing the edge modules 30a, 30b to the main blade module 26.

Figure 5:
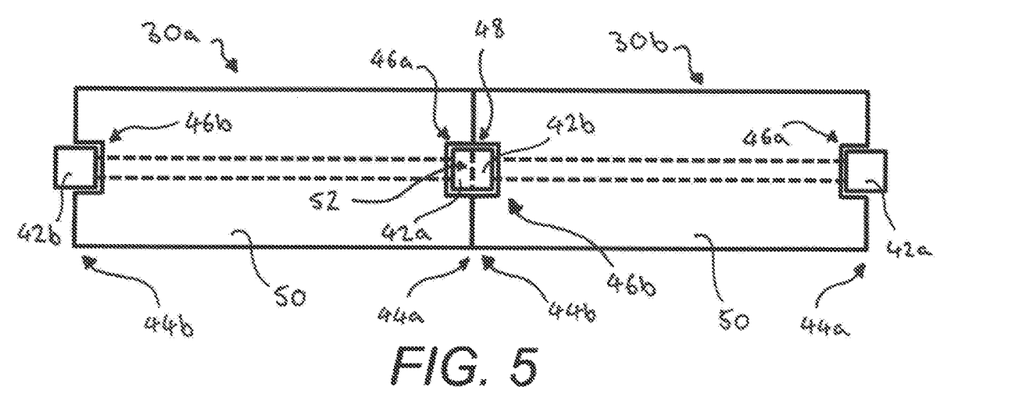
FIG. 5 is a variant of FIG. 4 showing cut-out portions at the ends of the edge modules.

Referring to FIG. 5, this schematically shows first and second edge modules 30a, 30b arranged end-to-end according to a variant of the previous example. In this variant, the edge modules 30a, 30b include cut-out portions 46a, 46b at their ends 44a, 44b. The electrical connectors 42a, 42b are at least partially arranged in these cut-outs 46a, 46b. When the adjacent edge modules 30a, 30b are fitted end-to-end, the respective cut-outs 46a, 46b define an aperture 48 in an outer surface 50 of the edge modules 30a, 30b. The cut-outs 46a, 46b provide easy access to the electrical connector assembly 52 inside the edge modules 30a, 30b, so that the connector assembly 52 can be accessed without the requirement to drill into the edge modules 30a, 30b.

Figure 6:
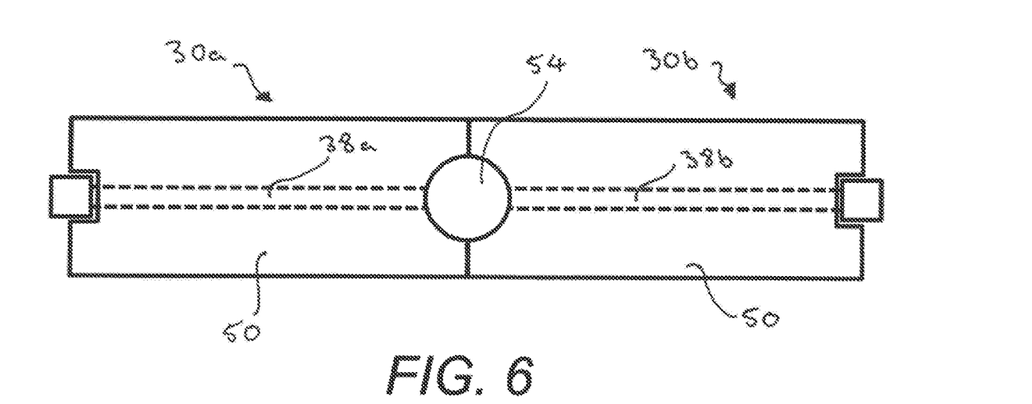
FIG. 6 shows a lightning receptor arranged in a cut-out portion between two edge modules.

Referring now to FIG. 6, this shows a lightning receptor 54 attached to the electrical connector assembly 52 between adjacent edge modules 30*a*, 30*b*. Part of the lightning receptor 54 may be screwed into a socket provided in the electrical connector assembly 52 or may otherwise be connected to the electrical assembly 52. The lightning receptor 54 is at least partially located in the aperture 48 in the outer surface 50 of the edge modules 30*a*, 30*b* defined by the cut-outs 46*a*, 46*b* (shown in FIG. 5). The lightning receptor 54 safeguards against a direct lightning strike to the connector assemblies 52 between adjacent edge modules 30*a*, 30*b*. In particular, the lightning receptor 54 provides a safe attachment point for lightning to strike without penetrating the surface 50 of the trailing edge module(s) 30*a* and/or 30*b* and causing damage. The lightning current is safely conducted to ground via the down conductor cable 38*a*, 38*b*. The provision of lightning receptors 54 may dispense with the need to provide insulation around the down conductor 38.

Figure 7:
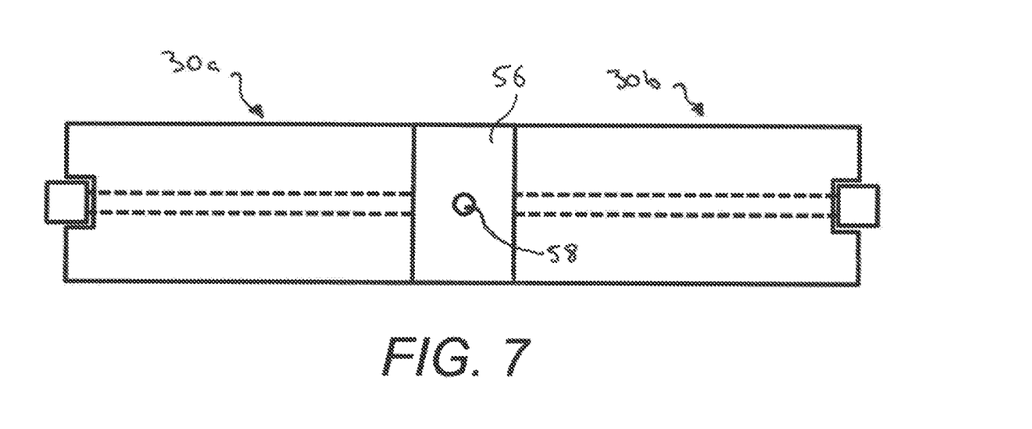
FIG. 7 shows a conductive cap arranged between two edge modules.

Referring now to FIG. 7, this shows a variant of the example shown in FIG. 6, in which a conductive cap 56 is provided between adjacent edge modules 30*a*, 30*b*. The conductive cap 56 functions as a lighting receptor and attaches to the electrical connector assemblies 52 via a metal bolt 58 which extends through the aperture 48 (shown in FIG. 5) that is provided in the surface 50 of the edge modules 30*a*, 30*b*. The conductive cap 56 covers the interface between the first and second edge modules 30*a*, 30*b*. The conductive cap 56 is advantageously larger than the receptor 54 shown in FIG. 6, and conforms to the aerodynamic profile of the edge module(s) 30*a* and/or 30*b*. The conductive cap 56 may be stamped, or otherwise formed, from sheet metal.

Figure 8:
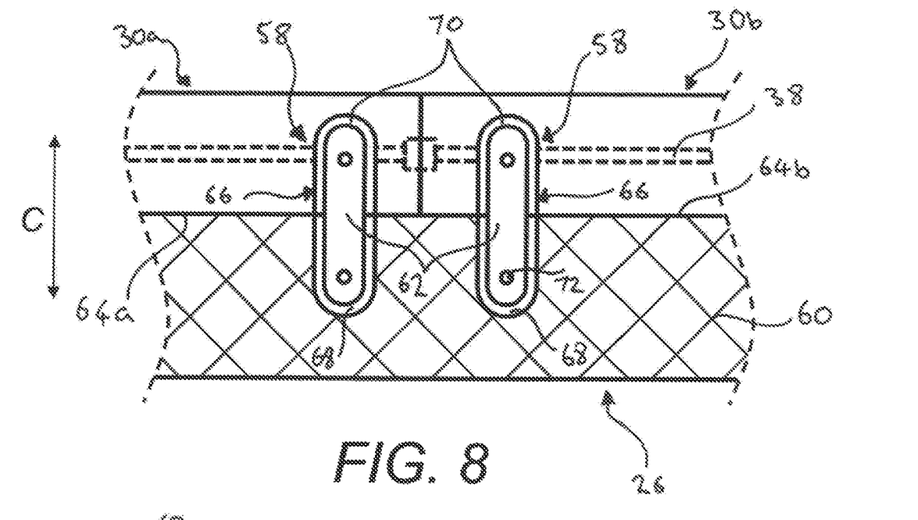
FIG. 8 is a schematic plan view showing bus bars connected between edge modules and a metallic layer of the main blade module.

Referring now to FIG. 8, this schematically shows electrical connections 58 between the edge modules 30*a*, 30*b* and a layer 60 of the main blade module 26. The layer 60 is a part of the lightning protection system and is in the form of a metal foil or mesh. Further details of the layer 60 can be found in applicant's co-pending PCT application WO2015/055214A1. In this example, the layer 60 of the main blade module 26 is a conductive layer, which may be integrated within the shell structure of the main blade module 26 near its outer surface. The conductive layer 60 may be in the form of a metallic mesh. The layer 60 serves to dissipate the current from a lightning strike on the main blade module 26 over a large area. In order to conduct the current to ground, the layer 60 is electrically connected to the down conductor 38 inside the edge module 30 via one or more electrical links 62. In this example two electrical links 62 are shown, one for each of the edge modules 30*a*, 30*b*. In other embodiments, the number of electrical links 62 may be different to the number of edge modules 30. In this embodiment, the electrical links 62 are in the form of bus bars. The electrical links 62 extend in a chordwise direction (C) across an interface 64*a*, 64*b* between the main blade module 26 and a respective edge module 30*a*, 30*b*. The electrical links 62 may each be located in a respective chordwise channel 66 defined by mutually aligned first and second recesses 68, 70 defined in the outer surfaces of the main blade module 26 and the edge module 30. Bolts 72 are used to connect the bus bars 62 to the electrical connector assemblies 52 described previously or to other connectors provided on the down conductor 38 and to the main blade module 26. The bolts 72 may only provide a mechanical connection, with the electrical connection being provided by electrical contacts as described below.

Figure 9:
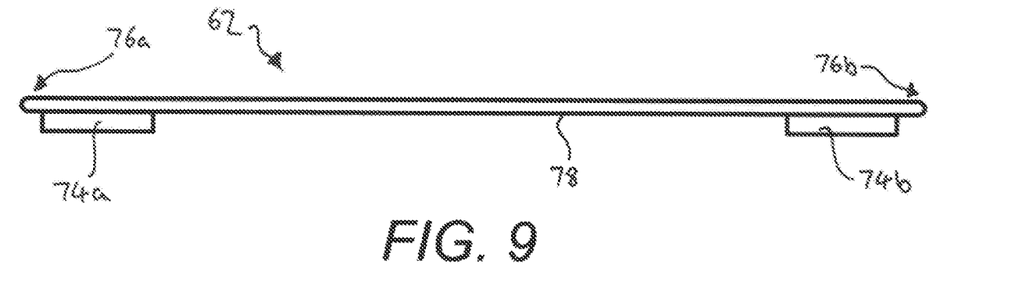
FIG. 9 is a schematic side view of a bus bar.

Referring now to FIG. 9, this shows a side view of one of the bus bars 62 shown in FIG. 8. The bus bar 62 comprises first and second electrical contacts 74*a*, 74*b* at each end 76*a*, 76*b* on an underside 78 of the bus bar 62. In this example, these electrical contacts 74*a*, 74*b* are in the form of cast metal discs. The first disc 74*a* provides an electrical contact to the layer 60 and the second disc 74*b* provides an electrical contact to the down conductor 38 of the trailing edge module 30, as will be described in more detail below.

Figure 10:
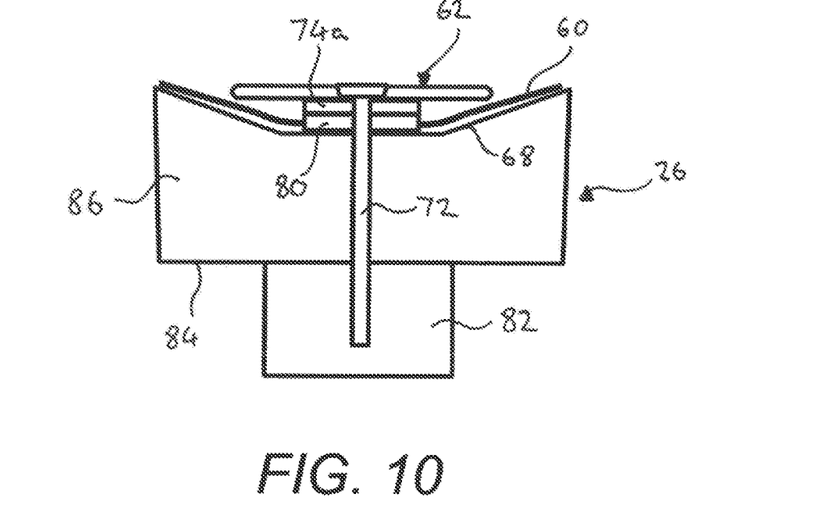
FIG. 10 is a schematic cross section through part of the main blade module showing an electrical connection between a bus bar and a metallic layer.

Referring to FIG. 10, this is a schematic cross sectional view through part of the main blade module 26 showing a bus bar 62 arranged in the first recess 68 defined in the main blade module 26. FIG. 10 also schematically shows the layer 60 within the recess 68. A metallic disc 80 is located in the recess 68 and is integrated with the layer 60. The metallic disc 80 forms an electrical contact. An electrical contact disc 74*a* on the underside 78 of the bus bar 62 sits on top of the metallic disc 80 to form an electrical connection between the layer 60 and the bus bar 62. The bus bar 62 is fixed in position via a bolt 72 that is drilled into a non-conductive block 82 provided on an inner surface 84 of the laminate shell 86 of the main blade module 26.

Figure 11:
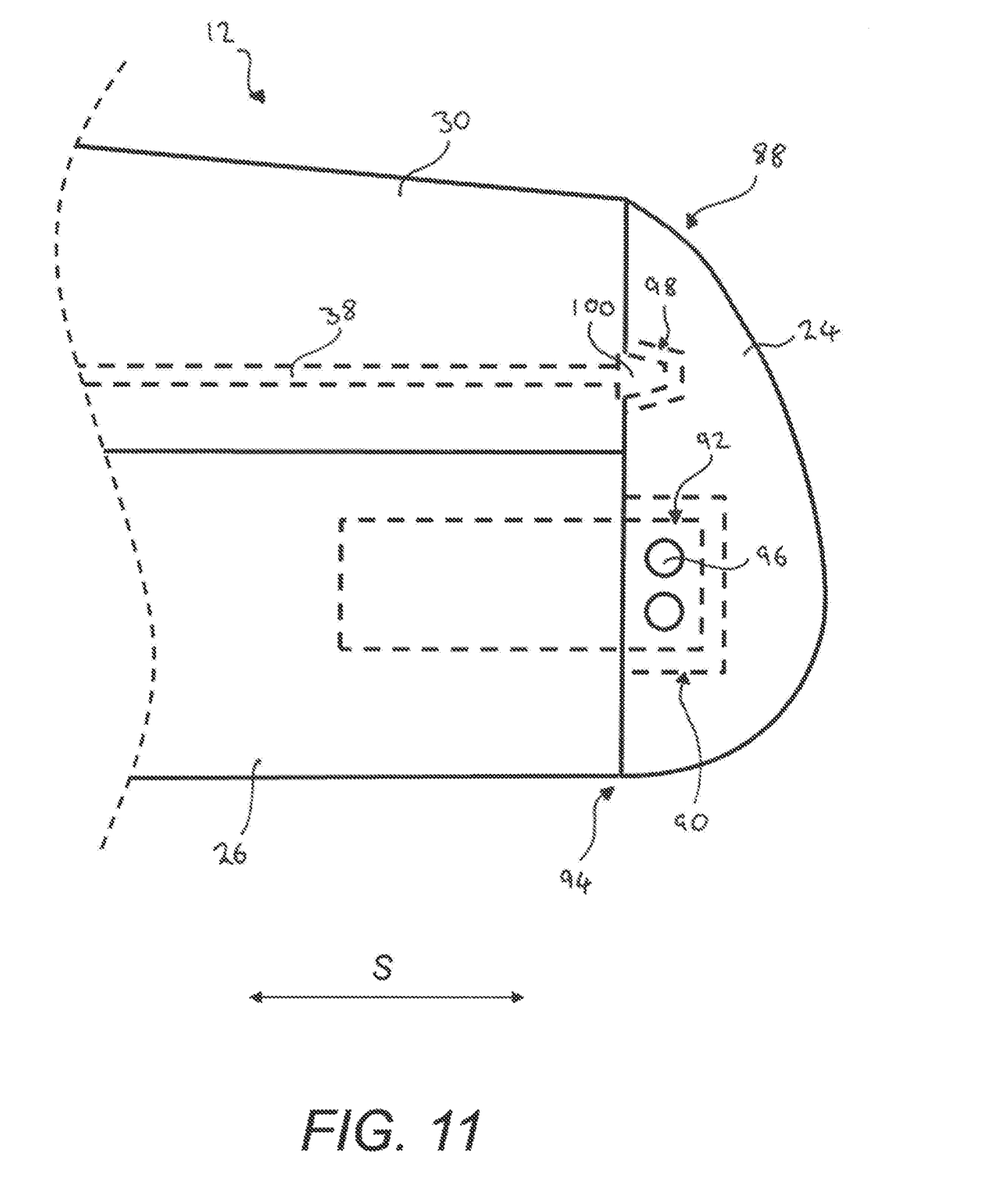
FIG. 11 schematically shows a metal tip of the blade with separate mechanical and electrical connections to the main blade module and a trailing edge module.

Referring to FIG. 11, this schematically shows the tip end 88 of the wind turbine blade 12 including the metal tip 24, mentioned previously with reference to FIG. 1. The metal tip 24 comprises a mechanical attachment feature 90 for connecting the metal tip 24 to the main blade module 26. In this example, the mechanical attachment feature 90 is a female feature, and specifically comprises a rectangular recess in the metal tip 24. The main blade module 26 includes a corresponding male mechanical attachment feature 92 that mates with the female mechanical attachment feature 90 of the metal tip 24 to connect the metal tip 24 to the main blade module 26. The male attachment feature 92 in this example is a tip implant that projects in a spanwise direction (S) from a tip end 94 of the main blade module 26. The tip implant 92 in this example is a preferably rectangular block of non-conductive material, for example polyurethane or glass fibre. The protruding tip implant 92 is received in the rectangular recess 90 of the metal tip 24. Shims (not shown) may be inserted between the tip implant 92 and recess 90 if required to adjust the position of the tip 24 with respect to the main blade module 26. The metal tip 24 is then bolted to the tip implant 92 with bolts 96 that extend through holes (not shown) provided through the surface of the metal tip 24. A strong mechanical connection between the metal tip 24 and the main blade module 26 is therefore achieved.

The metal tip 24 further includes a separate electrical terminal 98 for connecting the metal tip 24 to the down conductor 38 of an edge module 30. In this example, the electrical terminal 98 is a female feature, and specifically comprises a recessed socket in the metal tip 24. A male plug 100 is provided at the end of the down conductor cable 38. The plug 100 is received in the socket 98 to establish an electrical connection between the metal tip 24 and the down conductor 38 of the edge module 30. Screws (not shown) may be used to secure the plug 100 within the socket 98. The electrical terminal 98 of the metal tip 24 is smaller than the mechanical attachment feature 90 of the metal tip 24.

As shown in FIG. 11, the mechanical attachment between the metal tip 24 and the remainder of the blade 12 is separate from the electrical connection between the metal tip 24 and the down conductor 38. The mechanical and electrical connections are therefore decoupled. In previous known solutions, the metal tip 24 has been connected to the blade 12 via a single connection that provides both a mechanical and electrical connection. This entailed the use of a solid metal tip implant 92. The present solution dispenses with the need for such an expensive and heavy tip implant 92 and allows the use of a cheaper and more lightweight tip implant 92 to provide the mechanical connection. The electrical connection can therefore be made significantly smaller and at lower cost than the previous electrical connection since it is not required to perform a mechanical attachment function between the metal tip 24 and the remainder of the blade 12. As the mechanical attachment does not have to carry lightning current there is also more freedom in the geometrical design of the tip implant, as there will be no risk of electrical arcing between the metal tip 24 and the tip implant 92.

The present invention presents significant advantages over the prior art. In particular, locating the down conductor 38 within a premanufactured edge module 30 greatly facilitates the blade manufacturing process and reduces the time taken to make a blade 12. The edge modules 30 may be premanufactured offline and simply attached to the main blade module 26. The down conductors 38 of adjacent edge modules 30 can be connected together quickly and efficiently. Lightning receptors 54 may be included and attached easily to the down conductor 38 at the appropriate locations. There is no longer the need for the time-consuming process of laying the down conductor cable 38 inside the blade 12 and then drilling holes through the blade shell 86 to mount the lightning receptors 54.

Many modifications may be made to the examples described above without departing from the scope of the present invention as defined in the accompanying claims.

For example, whilst the edge module 30 described in the above examples is a trailing edge module 30, in other examples the edge module 30 may be a leading edge module that defines at least part of the leading edge 28 of the blade 12. In this case, the down conductor 38 would be located near the leading edge 28 of the blade 12. In other examples, the edge module 30 could be a single module that forms substantially the entire leading edge 28 or trailing edge 32 of the blade 12. Whilst the metal tip 24 in the above example comprises female features 90, 98, in other examples one or both of the mechanical attachment feature 90 and the electrical terminal 98 may be a male feature and the main blade module 26 and/or the edge module 30 may be provided with a corresponding female feature.

The invention claimed is:

1. A wind turbine blade comprising a main blade module defining a main body of the blade, and a separate edge module attached to the main blade module along an interface extending in a spanwise direction of the wind turbine blade, the edge module defining at least part of a trailing edge of the blade,
wherein a down conductor for a blade lightning protection system is embedded within the edge module.

2. The wind turbine blade of claim 1, wherein a plurality of edge modules are attached to the main blade module and are arranged adjacent to one another in a spanwise direction of the blade, each edge module defining part of the trailing edge of the blade, and each edge module comprising a down conductor, wherein the down conductors of adjacent edge modules are electrically connected together.

3. The wind turbine blade of claim 2, wherein the down conductors of first and second adjacent edge modules are electrically connected together via an electrical connector assembly.

4. The wind turbine blade of claim 3, wherein the electrical connector assembly comprises a first electrical connector provided at an end of the first edge module, and a second electrical connector provided at an end of the second edge module.

5. The wind turbine blade of claim 3, further comprising a lightning receptor attached to the electrical connector assembly.

6. The wind turbine blade of claim 5, wherein the lightning receptor is at least partially accommodated within an aperture in an outer surface of the first and/or second edge module.

7. The wind turbine blade of claim 5, wherein the lightning receptor is in the form of a conductive cap that at least partially covers an interface between the first and second edge modules, the conductive cap being arranged externally on the edge modules.

8. The wind turbine blade of claim 1, wherein the main blade module comprises a conductive layer at or near its outer surface and wherein the down conductor of the edge module is electrically connected to the conductive layer.

9. The wind turbine blade of claim 8, wherein the down conductor of the or each edge module is electrically connected to the conductive layer via a respective electrical link.

10. The wind turbine blade of claim 9, wherein the or each electrical link extends in a generally chordwise direction across an interface between the main blade module and a respective edge module.

11. The wind turbine blade of claim 9, wherein the or each electrical link is received in a respective chordwise channel defined in an outer surface of the blade, the or each channel being defined in part by a first recess defined in the main blade module and in part by a second recess defined in the edge module, the recesses being aligned to define the respective chordwise channel,
and wherein a first electrical contact is located within the first recess and a second electrical contact is located within the second recess, the first electrical contact being electrically connected to the conductive layer of the main blade module and the second electrical contact being electrically connected to the down conductor of the edge module.

12. The wind turbine blade of claim 9, wherein the electrical link is a bus bar.

13. The wind turbine blade of claim 1, further comprising a metal tip, wherein the metal tip comprises: a mechanical attachment feature for connecting the metal tip to the main blade module, and an electrical terminal for connecting the metal tip to the down conductor within the edge module.

14. The wind turbine blade of claim 13, wherein the mechanical attachment feature is a male/female feature for mating with a corresponding female/male mechanical attachment feature of the main blade module, and/or wherein the electrical terminal is a male/female feature for mating with a corresponding female/male electrical terminal of the edge module.

15. The wind turbine blade of claim 13, wherein the electrical terminal of the metal tip is smaller than the mechanical attachment feature of the metal tip.

* * * * *